United States Patent [19]

Reinartz

[11] Patent Number: 5,184,575
[45] Date of Patent: Feb. 9, 1993

[54] SANITARY FACILITY FOR CATS

[76] Inventor: Johann O. Reinartz, Herrenlaudstr. 32, D-4057 Brüggen 1, Fed. Rep. of Germany

[21] Appl. No.: 671,883
[22] PCT Filed: Feb. 22, 1990
[86] PCT No.: PCT/DE90/00120
  § 371 Date: Mar. 29, 1991
  § 102(e) Date: Mar. 29, 1991
[87] PCT Pub. No.: WO90/14759
  PCT Pub. Date: Dec. 13, 1990

[30] Foreign Application Priority Data

Jun. 2, 1989 [DE] Fed. Rep. of Germany ....... 3918121

[51] Int. Cl.⁵ ............................................. A01K 1/01
[52] U.S. Cl. .................................. 119/163; 119/165
[58] Field of Search ............... 119/161, 162, 163, 164, 119/165; 4/661

[56] References Cited

U.S. PATENT DOCUMENTS

| 3,621,817 | 11/1971 | Priutz | 119/163 |
| 3,954,086 | 5/1976 | Mauess | 119/163 |
| 4,574,735 | 3/1986 | Hohenstein | 119/163 |
| 4,729,342 | 3/1988 | Loctin | 119/1 |
| 4,732,111 | 3/1988 | Runion | 119/1 |
| 4,844,011 | 7/1989 | Strickland | 119/164 |
| 5,003,920 | 4/1991 | Miksite | 119/163 |

FOREIGN PATENT DOCUMENTS

| 8419845.1 | 11/1984 | Fed. Rep. of Germany . |
| 8609826 | 5/1986 | Fed. Rep. of Germany . |
| 8905314.1 | 10/1989 | Fed. Rep. of Germany . |
| 2403958 | 4/1979 | France . |
| 2437467 | 4/1980 | France . |

Primary Examiner—John G. Weiss
Attorney, Agent, or Firm—Burns, Doane, Swecker & Mathis

[57] ABSTRACT

The advantage of this toilet for cats relative to conventional models consists of the fact that the toilet automatically cleans itself after each use and is again automatically supplied with fresh cat litter.

Annoying odors are extensively eliminated by that the used cat litter is immediately removed into a separately mounted, air tight waste container equipped with a replaceable bag, by a slide.

This satisfies both the hygienic requirements of contemporary household pet maintenance and the cleanliness needs of cats.

The probelm is resolved by that a slide is located in the cat toilet facility, which moves the used cat litter into an automatically opening and closing waste container and that subsequently fresh cat litter is distributed over the bottom by an automatic refill device. To prevent access to the toilet facility during the cleaning process, the inlet is closed by a sliding door.

15 Claims, 4 Drawing Sheets

SANITARY FACILITY FOR CATS

BACKGROUND OF THE INVENTION

The present invention concerns a sanitary facility for cats with automatic cleaning and refilling.

The automatically self-cleaning and self-refilling toilet facility for cats is intended to improve the hygiene of the keeping of household animals.

Annoying odors, which are common in the case of conventional cat toilets are extensively eliminated. Similarly, no manual cleaning, also customary with conventional cat facilities, is required.

Toilet facilities for cats have been known for years and are commercially available in simple forms.

They consist of simple plastic tubs, usually provided with a narrow, removable rim. Another form consists of a simple plastic tub with a transparent, removable upper part, closed all around with the exception of the inlet hole. More recently, replaceable plastic inserts with premeasured quantities of cat litter, have become available.

The disadvantage of these conventional cat toilets available on the market is that they must be cleaned manually after use or the replaceable plastic insert with the used cat litter must be removed by hand.

This process must be repeated after every use for hygienic reasons and also in view of the need for cleanliness of cats.

Another disadvantage of conventional cat toilets is that in spite of the employment of odor retaining cat litters, disagreeable odors are released after use.

A self-cleaning cat toiler is known—G 89 05 314.1.

However, this cat toilet has the following disadvantages.

The used cat litter, on which the cat has already relieved itself, is removed by means of a conveyor belt. For one, due to its mobility, the belt is a hindrance for the cat, which always endeavors to have solid ground under its feet, and secondly parts of the feces remains on the belt in spite of the stripper plate, so that the annoyance of odors is not reduced, due to the feces residues drying in air.

Furthermore, the conveyor belt does not seal the waste container in an air tight manner, as a conveyor belt due to its motion, can never seal as tightly as a tight lid.

Another disadvatage consists of the fact that the cat litter, which drops following the removal process from above through an opening in the conveyor belt onto the bottom, is located on one side of the cat toilet only and is not distributed over the entire bottom.

In addition, due to the fact that the orifices of the litter chamber are closed by the moving belt only, it is not assured that the litter, which is granular to powdery, will deposit on and adhere to the conveyor belt, thereby in time rendering the movement of the rolls impassible.

Furthermore, the conveyor belt may be replaced with difficulty and at a certain expense only.

A further significant disadvantage of this cat toilet is the swinging door, as the cat must virtually push the door open with its head, which involves the risk that its head will be squeezed between the retreating parts of the door, and the cat after this poor experience will not be disposed to use the facility again, the more so since cats are used to relieve themselves in a container with a free opening.

Another risk factor for the cat is the fact that there is no device to prevent it from entering the facility during the movement of the conveyor belt.

Another cat toilet is known from G 84 19 845.1.

This facility has essentially the same disadvantages as the toilet described above. The plastic foil, which is resting on a solid bottom and upon which the cat is relieving itself, is rolled up manually or automatically, wherein the evaporation of the cat urine represents a considerable olfactory nuisance.

Disagreeable odors result further from the storage of the used, i.e. wet, cat litter in a replaceable bag under a receiving container for excrements, which is not sealed in an air tight manner.

The feces separated in the receiving container is again not tightly sealed in and must be removed manually.

In recent years the number of cats maintained as domestic pets has increased considerably.

This is due firstly to that fact that even single person households, the number of which has been steadily rising, are able to keep cats, and secondly, that there is a trend of keeping two or more cats in one household.

SUMMARY OF THE INVENTION

It is the object of the present invention to provide a toilet facility for cats, which takes into account both the hygienic needs of persons and the cats and the possibility of comfortably removing the used cat litter.

This object is attained by that this toilet facility for cats represents a sanitary device, which cleans itself automatically after each use and is supplied automatically with fresh cat litter.

The automatic cleaning after every use extensively eliminates annoying odors and the risk that the cat, as a form of protest against a soiled cat toilet, relieves itself elsewhere.

The disagreeable odor of used cat litter is extensively avoided by that the used litter is pushed immediately after the cat has left the facility, by means of an automatic sliding device, into a separately mounted, air tight waste container, equipped with a replaceable bag.

DETAILED DESCRIPTION OF THE PREFERRED EMBODIMENTS

Figure 1:
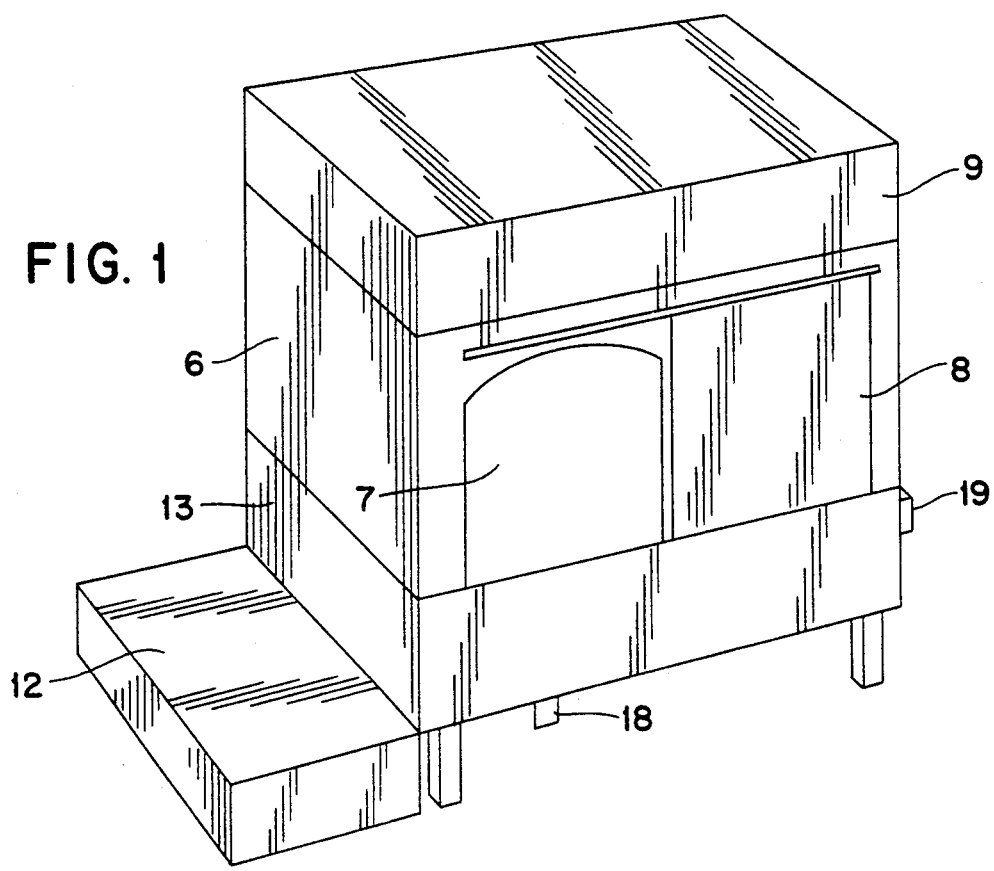
FIGS. 1 and 2 are perspective views of the sanitary facility of the present invention.
Figure 2:
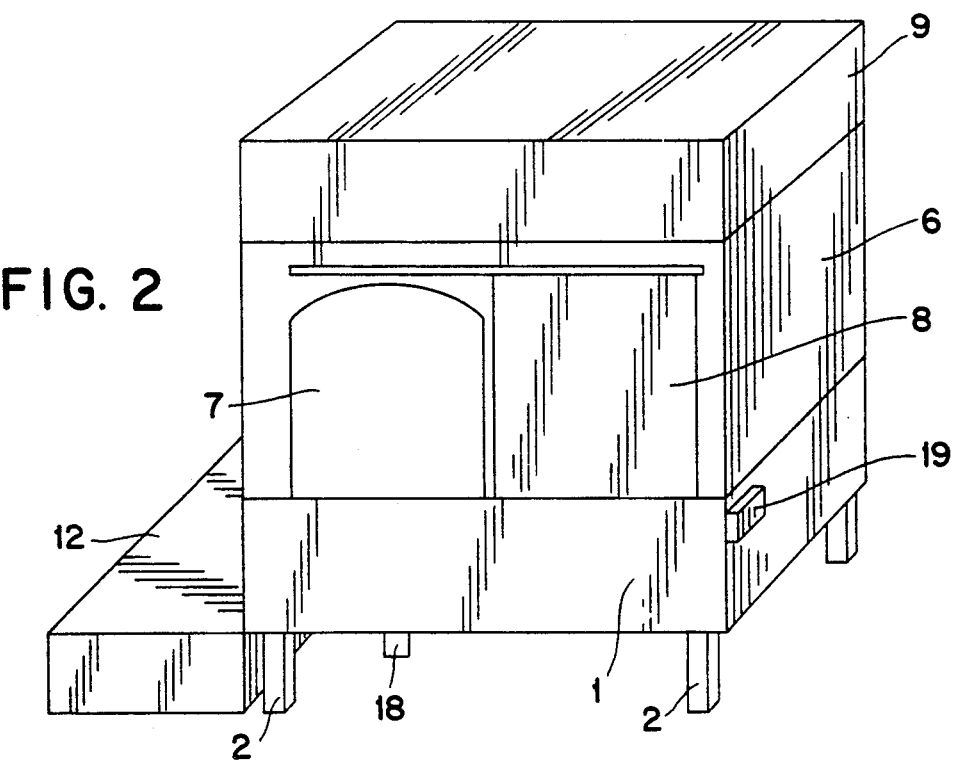
Figure 3:
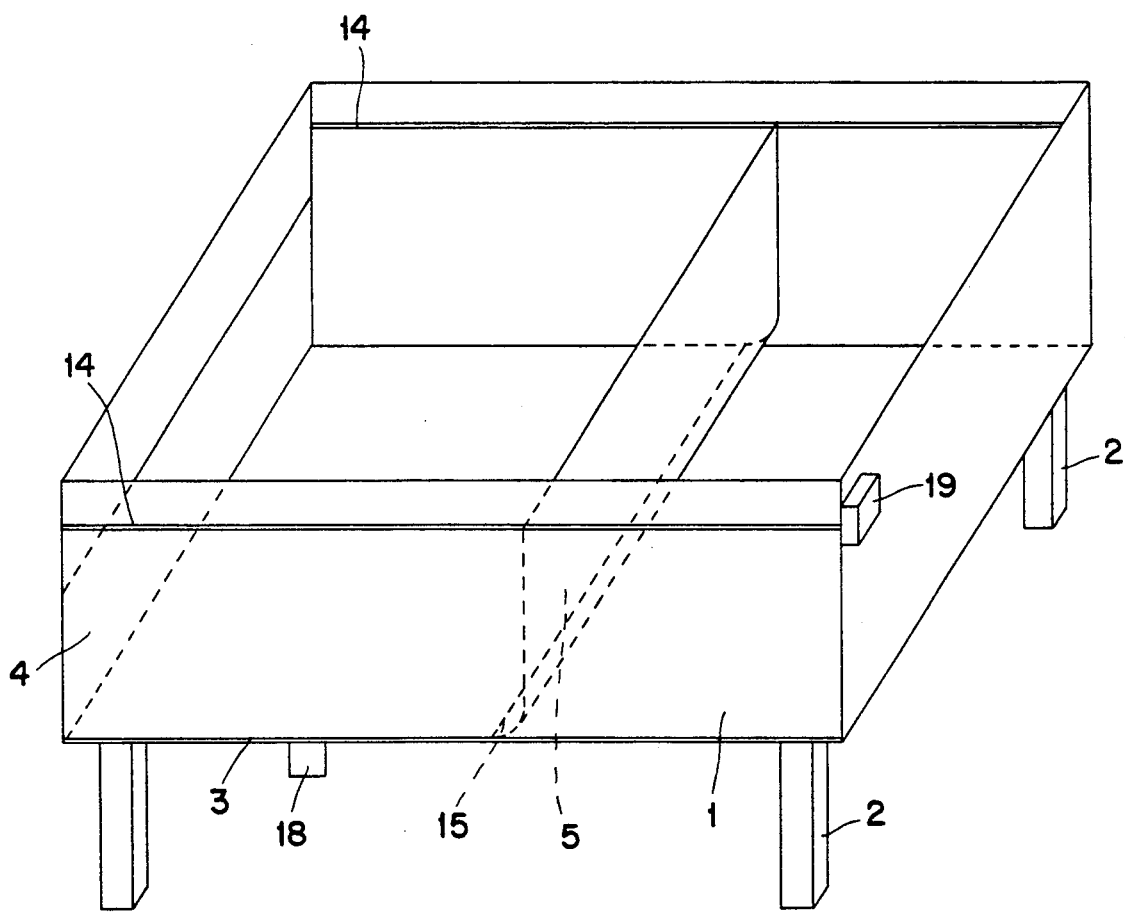
FIG. 3 is a perspective view of the bottom portion of the present invention.
Figure 4:
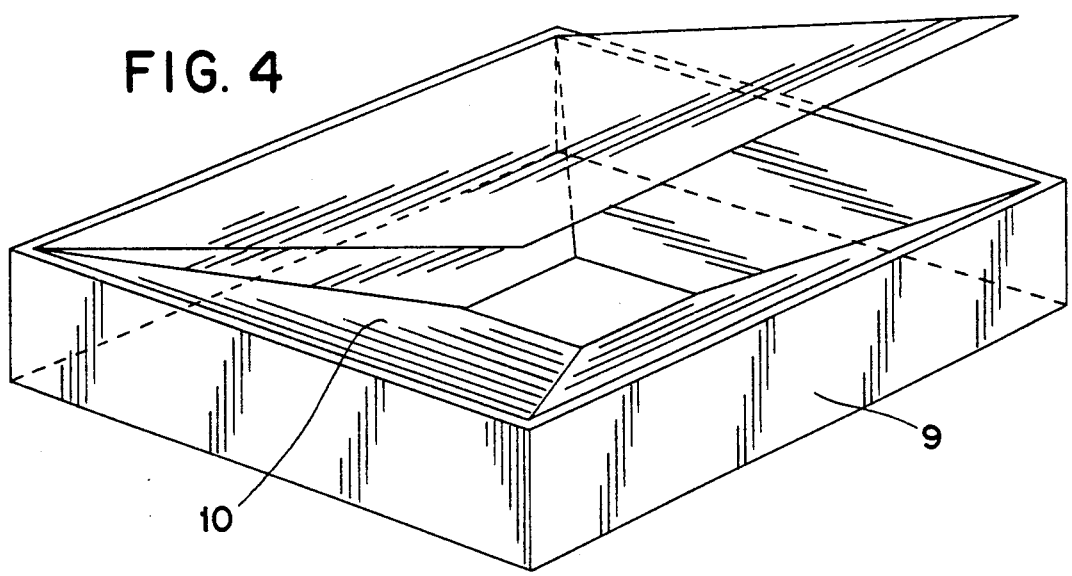
FIG. 4 is a perspective view of the inside of the top portion of the present invention.
Figure 5:
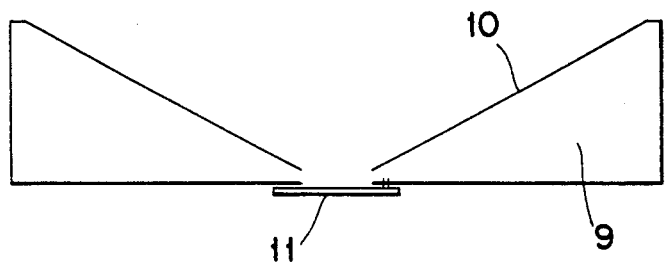
FIGS. 5 and 6 are views of additional details of the top portion of the present invention.
Figure 6:
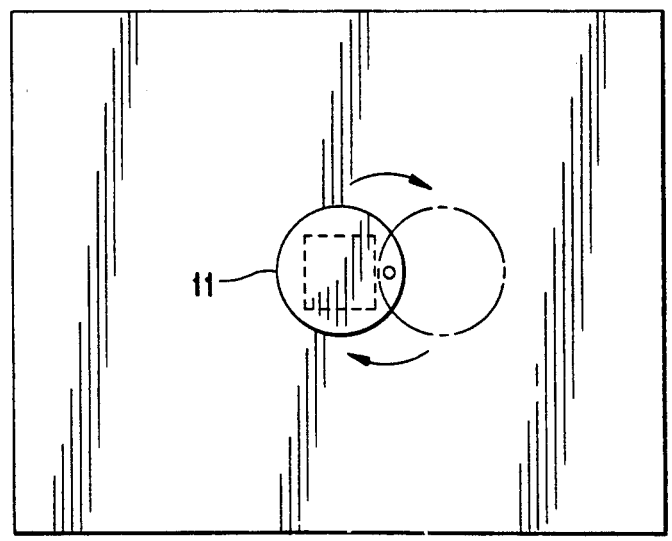
Figure 7:
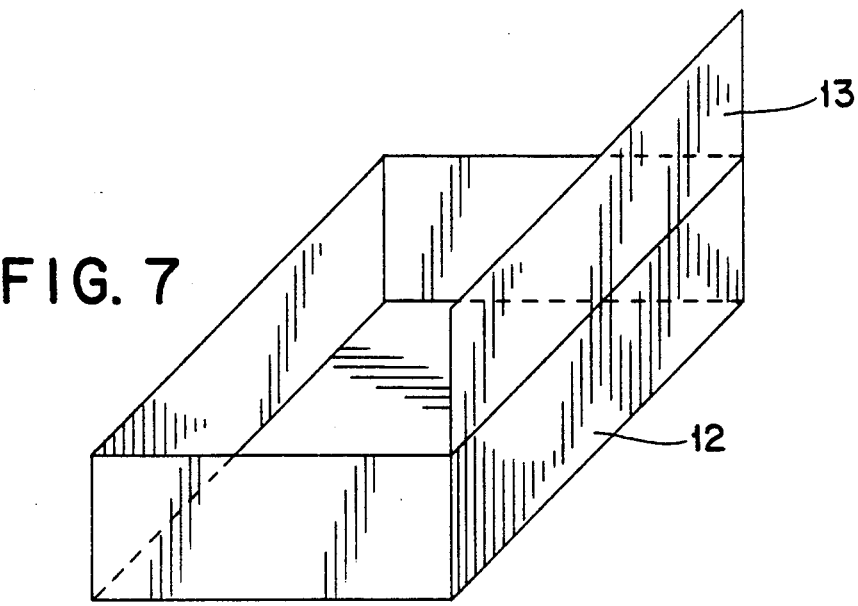
FIGS. 7 and 8 are views of the waste container of the present invention.
Figure 8:
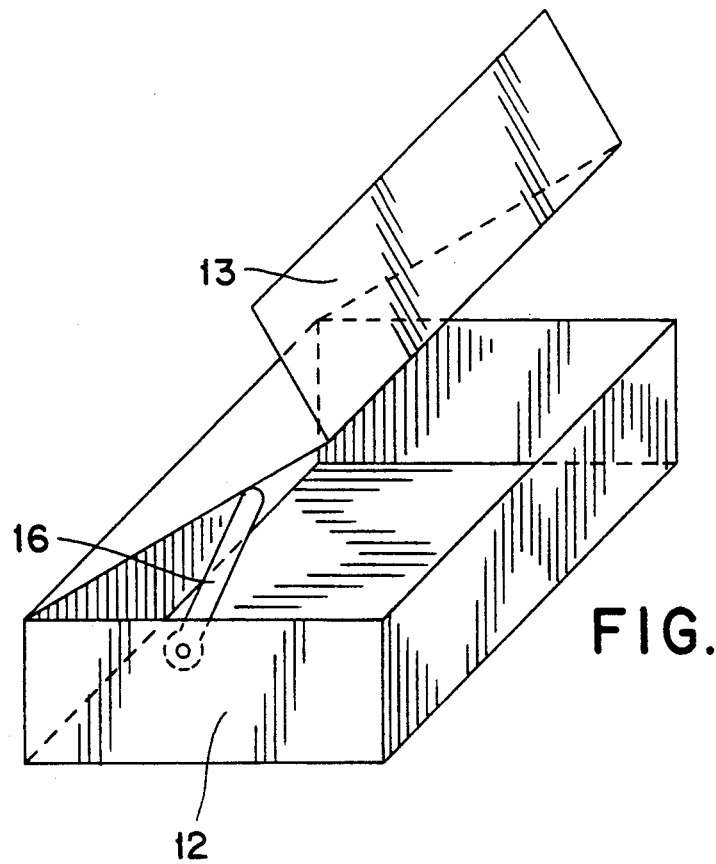

The cat toilet consists of three interlocking parts, a separate waste container and a slide, together with a sliding door.

The rectangular, tub shaped bottom part (1) is equipped with a pedestal (2), i.e. legs or the like. In its left hand nar‚ w side an opening (4) extending over the entire width, is provided.

The replaceable bottom (3), which is slid over the solid bottom, is inserted from this side. The upper closure of the bottom part is laid out so that the center part (6) may be set onto it.

In the bottom part, the slide (5) which is slightly curved and flattened in the forward direction, is running on guides. The flattened part (15) of said slide (5) is replaceable; it moves the used cat litter over the replaceable bottom (3) from right to left, into the separate waste container (12) mounted there by means of a suspension device.

The center part (6), which is set onto the bottom part (1), is open in both the upward and the downward direction. This center part may consist of a single piece, but it may also consist of four plates set into a groove forming the upper end of the bottom part. In the frontal long side an arc shaped inlet (7) is located; it may be closed by means of a sliding door (8).

The arc shaped inlet is not centered, but offset to the left.

The upper part (9) of the cat toilet is closed in the downward direction, except for an opening in the center toward the top; it is provided with a lid.

Inside the upper part a funnel shaped storage container (10) is located for the cat litter; it may be closed in the downward direction by a disk (11) rotating around a fixed point.

The upper part (9) is set onto the center part (6).

The separate waste container (12) is closed all around. Its top part is a lid opening to the left.

On the right hand side of the lid an upward projecting part (13) is mounted, which in the closed state of the waste container closes the opening (4) located in the left narrow side of the bottom part, so that the toilet for cats is closed all round, except for the inlet (7).

Both the lid and the waste container are equipped with gaskets, so that air tight sealing is assured.

The lid is opened by a lever arm (16) prior to the cleaning process and closes after the completion of the refill process.

Inside the cat toilet, sensors 21 are installed, which detect both the entering and the exit of the cat and control the cleaning and refill process in a time delayed manner.

The sensors are installed between the stationary and the replaceable bottom of the bottom part.

The entry into the cat toilet of the cat is detected by the sensors installed between the stationary and removable bottoms of the bottom part. However, the cleaning and refill process begins with a time delay only after the cat has left the facility.

At first, the lid of the waste container (12) equipped with a replaceable bag opens thereby releasing the opening in the bottom part (4).

The lid is opened by a lever arm (16) driven by a small gear motor 18.

Simultaneously with the opening of the lid and driven by the same motor, the sliding door (8) closes the inlet (7), thereby preventing access to the toilet facility during the entire cleaning and refill process.

When the lid of the waste container is open and the inlet closed by the sliding door, the slide (5) located in the bottom part and is slightly curved and flattened in its forward section (15) that is replaceable, is set into motion.

The slide (5), which runs on one or several guide rails (14) and is driven over pinions set into the walls of the long sides and gears, by a small gear motor 19, now pushes the used cat litter from right to left over the replaceable bottom (3), through the opening (4) in the bottom part, into the open waste container (12) equipped with a replaceable bag.

Following the discharge of the used cat litter by the slide into the waste container, the slide returns into its initial position.

After the slide has arrived in its original position, the refill process begins.

The opening of the funnel shaped storage container (10) located in the upper part (9), which is closed by a disk (11) turning around a fixed point, is released by the rotation of the disk and an accurately metered quantity of the cat litter stored in the container (10) may drop through the opening onto the replaceable bottom (3). The disk, driven by a small gear motor 20, turns around a fixed point over 360°.

The cat litter is metered by that the disk releases the opening of the storage contained only long enough for the passage of the necessary quantity of cat litter.

This is effected by means of the rpm of the small gear motor to be used.

The angle of inclination of the funnel shaped storage container permits the sliding of the cat litter without difficulty, so that there is always a constant quantity of the cat litter present in the cat toilet. It is immaterial whether the litter is distributed evenly over the bottom, as the cat will scrape the litter prior to its use to where it is needed.

After the facility has been supplied with fresh cat litter and thus is again ready for use, the lid of the waste container closes and the inlet is released by the sliding door.

Only then is it possible for the cat to re-enter the toilet.

All of the aforedescribed processes are powered by three small gear motors and actuated and controlled by sensors.

The motors in each case have a capacity of 6 Volt, supplied by four 1.5 Volt batteries.

Obviously, the operation described above is only one of numerous possibilities and the invention is not restricted to the example of embodiment described, as it is feasibly relative to the method, the mechanics and the material to effect structural changes and modifications.

All of the individual and combined characteristics set forth in the above description are considered to be essential for the invention.

With this type of toilet facilities for cats, as already mentioned, no manual cleaning is necessary. The parts in contact with the used cat litter and thus with excrements, may be replaced easily and inexpensively.

The replaceability of the bottom upon which the cat litter is located, is advisable for hygienic reasons.

As cats both before and after relieving themselves distribute the cat litter by scratching, in time scratches will develop on the bottom in which parts of the used cat litter may deposit, thereby interfering with both the reduction of odors and the hygienic improvements to be achieved with these cat toilet facilities.

The replacement of the front section of the slide, which is contact with the soiled cat litter every time the facility is cleaned, is advisable for the same reasons.

The equipment with the waste container with a replaceable bag is as obvious as the use of bags in normal household trash cans and its replacement is possible in the same easy manner, without coming into contact with its contents.

As already mentioned, the example of embodiment described is merely one of numerous possible and feasible types.

This is equally true for the dimensions, shape and materials of the toilet for cats, and for the drives and guidance means, together with entire overall layout. The basic concept to be perceived in this invention is that the cat toilet facility is self-cleaning and is automatically supplied with fresh cat litter, so that manual cleaning that is required in conventional facilities, is no longer necessary.

Similarly, the example of embodiment described above is favorable, both with respect to the plastic material used, which is particularly advantageous in view of cost, ease of manufacture and for hygienic reasons, and the selection of the operational processes, which are beneficial both for humans and cats.

In spite of this, the object of the invention may also be attained by structural changes, modifications and adaptation of the example described, within the protective range of the invention.

What is claimed is:

1. Sanitary facility for domestic animals comprising:
   a bottom portion;
   said bottom portion having an opening on a first side thereof;
   a waste container located adjacent the opening on the first side of the bottom portion;
   said waste container including a lid that closes both the waste container and the opening on the first side of the bottom portion;
   a floor for said bottom portion, said bottom portion including a movable slide that can be moved so as to dump debris from the floor into the waste container;
   a center portion set upon said bottom portion, said center portion having an opening equipped with a door;
   a top portion set upon said center portion; and
   said top portion including a feeder to deposit cat litter onto the floor of said bottom portion.

2. The sanitary facility of claim 1, further comprising guide rails for guiding movement of the movable slide in the bottom portion.

3. The sanitary facility of claim 2, further comprising a motor for driving the movable slide in the guide rails.

4. The sanitary facility of claim 1, further comprising a sensor for detecting the presence of an animal within the sanitary facility.

5. The sanitary facility of claim 1, further comprising a motor for opening and closing the lid of the waste container and for opening and closing the door of the center portion.

6. The sanitary facility of claim 1, wherein the feeder includes a rotatable disk for controlling flow from the feeder, and further including a motor for driving the rotatable disk.

7. A sanitary facility for domestic animals, comprising:
   a bottom portion;
   said bottom portion having an opening on a first side thereof;
   a waste container located adjacent the opening on the first side of the bottom portion;
   said waste container including a lid that closes both the waste container and the opening on the first side of the bottom portion;
   a floor for said bottom portion, said bottom portion including means for dumping debris from the floor into the waste container;
   a center portion set upon said bottom portion, said center portion having an opening equipped with a door;
   a top portion set upon said center portion; and
   said top portion including means for feeding cat litter onto the floor of said bottom portion.

8. The sanitary facility of claim 7, further comprising guide rails for guiding movement of the dumping means in the bottom portion.

9. The sanitary facility of claim 8, further comprising a motor for driving the dumping means in the guide rails.

10. The sanitary facility of claim 7, further comprising means for detecting the presence of an animal within the sanitary facility.

11. The sanitary facility of claim 7, further comprising means for opening and closing the lid of the waste container and for opening and closing the door of the central portion.

12. The sanitary facility of claim 7, further comprising means for operating the feeding means.

13. A method of automatically cleaning a sanitary facility that has a slide movable over a floor for clearing debris from the floor into an adjacent waste container; a feeder provided in an upper portion of the sanitary facility; and sensors for detecting the presence of an animal in the sanitary facility; comprising the steps of:
   detecting when an animal has entered and left said sanitary facility;
   after said animal has left the sanitary facility, moving the slide over the floor so as to clear substantially all debris on the floor into the waste container; and
   feeding cat litter onto the floor of the sanitary facility.

14. The method of claim 13, wherein the sanitary facility further includes a door to prevent animals from entering the sanitary facility, further comprising the steps of:
   closing the door of the sanitary facility prior to moving the slide; and
   opening the door after feeding cat litter onto the floor.

15. The method of claim 14, wherein the method steps further include using a plurality of motors to drive the movable slide, to open and close the door, and to operate the feeder; and wherein the steps are performed automatically by said motors.

* * * * *